O. KAMPFE.
COVER FOR VESSELS.
APPLICATION FILED SEPT. 30, 1911.
1,039,140.
Patented Sept. 24, 1912.
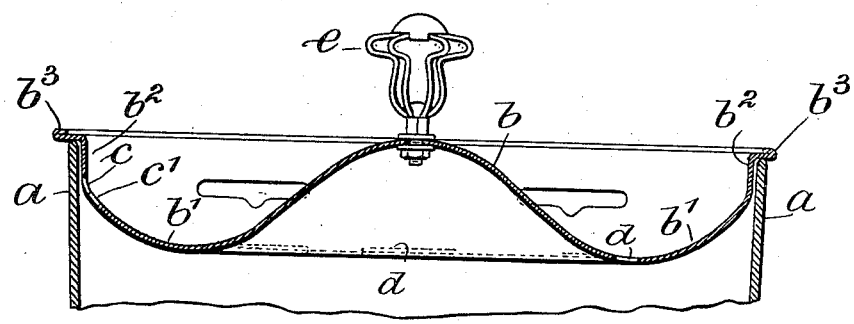
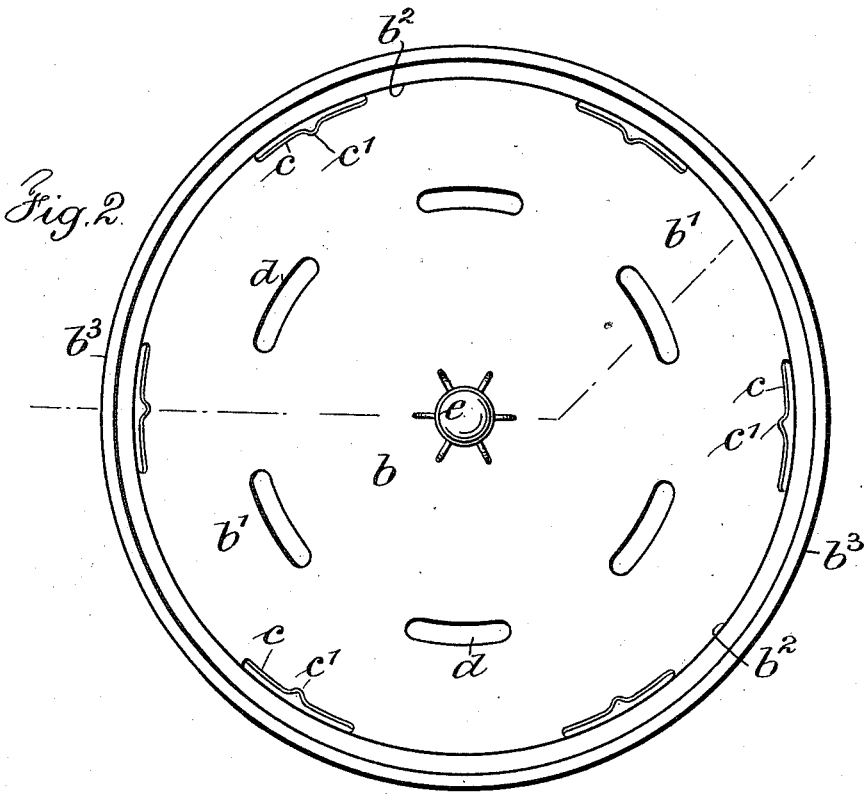
Witnesses
Chas. H. Smith
A. H. Serrell
Inventor
Otto Kampfe
by Harold Serrell
his atty.

UNITED STATES PATENT OFFICE.

OTTO KAMPFE, OF NEW YORK, N. Y.

COVER FOR VESSELS.

1,039,140.  Specification of Letters Patent.  Patented Sept. 24, 1912.

Application filed September 30, 1911. Serial No. 652,085.

*To all whom it may concern:*

Be it known that I, OTTO KAMPFE, a citizen of the United States, residing in the borough of Brooklyn, in the county of Kings, city and State of New York, have invented a new and useful Improvement in Covers for Vessels, of which the following is a specification.

My invention relates to an improved cover for vessels in which liquid is heated and kept at the boiling point for cooking, etc., and the same is an improvement upon the device shown and described in Letters Patent granted to O. and F. Kampfe, May 31, 1904, No. 761,498. The object sought to be accomplished by the device of said patent and by the device of my present invention, is the same, namely—to prevent liquid, while boiling, running over and out of its containing vessel, and so soiling the top of the stove and flashing into steam from contact with its hot surface, and also putting out the flame of the gas stove and so permitting the gas to escape into a kitchen or other room. I have demonstrated by my experiments that the device of said patent was not successful because the holes in the higher plane in the cover were too far from the wall of the vessel and also were not proportioned to those in the lower plane and did not obviate the tendency of the liquid to boil over.

In the device of my present invention the concavity of the cover is broadened to reach the inner wall of the vessel, for which the cover is adapted, and beyond this place the cover is simply provided with a flange to rest on the vessel for support. The holes in the upper plane consequently come close to the inner wall of the vessel, and as the boiling liquid rises on the inside, the holes provide passages for the immediate discharge of the liquid into the concavity of the cover, and the bottom holes for the return of such liquid into the vessel. This concavity is an annular depression. The holes in the upper plane are long and narrow, and in area substantially equal to the area of the bottom holes, and they are preferably provided centrally, in the lower edge, with a notch, as hereinafter described.

In the drawing, Figure 1 is a vertical central section through the cover and upper part of the vessel, upon which the cover is placed, and Fig. 2 is a plan of the cover.

$a$ represents the opposite walls of the vessel for holding liquid; such a vessel as is adapted to set upon a stove and in which water is boiled for cooking vegetables, or in which milk is boiled.

The cover comprises a domed center $b$, a surrounding concavity $b^1$, a peripheral wall $b^2$, and a supporting flange extending out in substantially a horizontal plane at $b^3$. From the drawing it will be apparent that the peripheral wall $b^2$ comes closely adjacent to the inner surface of the wall of the vessel, and that the flange $b^3$ rests upon the upper edge of the wall of the vessel all around the wall and serves as a support for the entire cover. The holes or slotted openings $c$ in the cover, in the higher plane, have their upper edge at about the union of the edge of the concavity $b^1$ and the peripheral wall $b^2$. These upper holes are narrow and long, and at about the center of their lower edge, are notched or cut downward to provide a delivery lip for the liquid. This is shown at $c^1$. The holes in the lower plane are shown at $d$. These come in the lowest part of the concavity of the cover. In area the holes $c$ and the holes $d$ bear a more or less exact relation to one another. That is to say, it would not answer for the holes $d$ to be much less in area, appreciably, than the holes $c$, otherwise the concavity of the cover would quickly fill up with boiling liquid up to the level of the upper holes $c$. It is, therefore, preferable for the lower holes $d$ to be large enough to carry away the liquid boiling over.

$e$ is a handle place at the center of the cover, and at the highest part of the domed center $b$. This handle may be of any desired character. I have, however, shown a handle formed of wire parts connected by a center button, and by a threaded shank held to the cover by a nut on the under side, although I do not limit my invention, in any respect, by the character of the handle.

In the operation or utility of the cover, it is well known that liquid in a vessel, when brought to a boil, not only expands and occupies a greater area, but flows up the inner surface of the walls of the vessel, and if such movement is not prevented, the liquid will flow over the edge of the vessel and spill onto the stove, and when this is the case, if the top of the stove is very hot, the liquid flashes in steam, to say nothing of soiling the top of the stove and making it frequently necessary to clean the same. With the cover of my invention in place, the liquid that boils up the center inner surface of the walls of the vessel, meets the peripheral wall $b^2$ and the flange $b^3$, which by their contact with the edge of the wall and proximity to the inner surface thereof, arrest the forward movement of the boiling liquid. The holes $c$ in the cover and adjacent to the peripheral wall $b^2$, provide an immediate relief to the boiling pressure and passage-ways for the liquid to find vent, the boiling liquid flowing through said holes $c$ and down into the concavity of the cover, over the outer surface of the concavity, and on reaching the lowest point of the concavity the liquid returns to the vessel through the holes $d$. In this way, it is possible for a constant circulation to be maintained of the boiling liquid without the liability or even possibility of the boiling liquid having sufficient force to lift the cover and find vent over the edge of the vessel onto the stove.

I have shown in number six holes $c$ and six holes $d$.

A further function performed by the cover, which is at the domed center, is in providing for the expansion of the liquid and a possible central relief for the same, and for any steam pressure.

The notch $c^1$, or lip, formed from the center of the lower edge of the holes $c$, provides for an initial flow of the boiling liquid in starting its exit through the holes $c$, as it is apparently easier for the liquid to make a start at this place than over the entire lower edge.

I claim as my invention:

1. A cover for vessels consisting of a domed central portion, a rim in a horizontal plane concentric with said portion, a peripheral wall depending from the inner edge of said rim and at right angles to said rim, which wall sets within and fits the wall of the liquid holding vessel, and said cover having an annular depression extending from the domed central portion to the lower edge of the peripheral wall and having holes or slotted openings therein at the lower part and in a higher plane at its union with the peripheral wall with other holes or slotted openings coming into juxtaposition with the inner surface of the vessel and serving as overflows for the discharge and return of the boiling liquid.

2. A cover for vessels consisting of a domed central portion, a rim in a horizontal plane concentric with said portion, a peripheral wall depending from the inner edge of said rim and at right angles to said rim, which wall sets within and fits the wall of the liquid holding vessel, and said cover having an annular depression extending from the domed central portion to the lower edge of the peripheral wall and having holes or slotted openings therein at the lower part and in a higher plane at its union with the peripheral wall with other holes or slotted openings coming into juxtaposition with the inner surface of the vessel and provided with notches or lips preferably at the center and in the lower edge of the slotted openings and serving as overflows for the discharge and return of the boiling liquid.

3. A sheet metal cover for a liquid holding vessel having a supporting flange and peripheral wall setting within and fitting the said vessel and provided with openings adjacent to the peripheral wall and the inner surface of the wall of the vessel for immediately receiving and forming an exit or relief for the boiling liquid and with other openings in a plane below the aforesaid openings, for returning the boiling liquid to the liquid holding vessel.

4. A sheet metal cover for a liquid holding vessel having a supporting flange and peripheral wall setting within and fitting the said vessel, said cover at the lower edge of said peripheral wall provided with circularly arranged elongated openings for immediately receiving and forming an overflow exit or relief for the boiling liquid and said cover having a portion in a plane below said opening and in which portion are other elongated openings circularly arranged for returning the boiling liquid to the liquid holding vessel.

Signed by me this 26th day of Sept., 1911.

OTTO KAMPFE.

Witnesses:
ARTHUR H. SERRELL,
MARY E. LELAND.

---

Copies of this patent may be obtained for five cents each, by addressing the "Commissioner of Patents, Washington, D. C."